(12) United States Patent
Wang et al.

(10) Patent No.: US 12,375,594 B2
(45) Date of Patent: Jul. 29, 2025

(54) ELECTRONIC DEVICE

(71) Applicant: VIVO MOBILE COMMUNICATION CO., LTD., Dongguan (CN)

(72) Inventors: Wei Wang, Dongguan (CN); Qi Ban, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 404 days.

(21) Appl. No.: 17/951,073

(22) Filed: Sep. 22, 2022

(65) Prior Publication Data

US 2023/0015804 A1    Jan. 19, 2023

Related U.S. Application Data

(63) Continuation of application No. PCT/CN2021/075178, filed on Feb. 4, 2021.

(30) Foreign Application Priority Data

Mar. 26, 2020   (CN) .......................... 202010222978.8

(51) Int. Cl.
  H04M 1/02         (2006.01)
(52) U.S. Cl.
  CPC .................... *H04M 1/026* (2013.01)
(58) Field of Classification Search
  CPC .. H04M 1/026; H04M 1/0256; H04M 1/0264; H04M 1/18
  See application file for complete search history.

(56) References Cited

U.S. PATENT DOCUMENTS

| 9,774,766 | B2 | 9/2017 | Park et al. |
| 2013/0265715 | A1 | 10/2013 | Bae et al. |
| 2019/0166236 | A1* | 5/2019 | Zeng ................... H04M 1/0264 |

FOREIGN PATENT DOCUMENTS

| CN | 1480933 | A | 3/2004 |
| CN | 200976410 | Y | 11/2007 |
| CN | 201146552 | Y | 11/2008 |
| CN | 101351096 | A | 1/2009 |
| CN | 202095214 | U | 12/2011 |

(Continued)

OTHER PUBLICATIONS

Office Action issued in related korean Application No. 10-2022-7035544, mailed Feb. 13, 2024, 6 pages.

(Continued)

*Primary Examiner* — Marisol Figueroa
(74) *Attorney, Agent, or Firm* — IPX PLLC

(57) ABSTRACT

An electronic device is provided. The electronic device includes a housing, a functional module, a blocking member, and a driving assembly. The housing has an inner cavity, and the inner cavity has an opening. The functional module protrudes outside the inner cavity through the opening and is separated from the housing or retracted into the inner cavity. The blocking member is movably disposed in the inner cavity, and the blocking member corresponds to the opening. The driving assembly is disposed in the inner cavity, the driving assembly is connected to the blocking member, the driving assembly drives the blocking member to switch between a first state and a second state, the blocking member is away from the opening in the first state, and the blocking member blocks the opening in the second state.

11 Claims, 6 Drawing Sheets

(56) References Cited

FOREIGN PATENT DOCUMENTS

| | | |
|---|---|---|
| CN | 203722944 U | 7/2014 |
| CN | 105554196 A | 5/2016 |
| CN | 206413044 U | 8/2017 |
| CN | 107800828 A | 3/2018 |
| CN | 108200244 A | 6/2018 |
| CN | 207442927 U | 6/2018 |
| CN | 207560151 U | 6/2018 |
| CN | 108337336 A | 7/2018 |
| CN | 110049222 A | 7/2019 |
| CN | 209517206 U | 10/2019 |
| CN | 110460694 A | 11/2019 |
| CN | 110460697 A | 11/2019 |
| CN | 110557470 A | 12/2019 |
| CN | 111405155 A | 7/2020 |
| CN | 111416896 A | 7/2020 |
| KR | 20140114792 A | 9/2014 |
| WO | 2019015651 A1 | 1/2019 |
| WO | 2020020132 A1 | 1/2020 |

OTHER PUBLICATIONS

Examination report issued in related Indian Application No. 202217059784, mailed Dec. 20, 2023, 6 pages.
International Search Report issued in corresponding International Application No. PCT/CN2021/075178, mailed Apr. 25, 2021, 6 pages.
First Office Action issued in related Chinese Application No. 202010222978.8 mailed Oct. 13, 2020, 7 pages.
Second Office Action issued in related Chinese Application No. 202010222978.8 mailed Jun. 9, 2021, 8 pages.
Third Office Action issued in related Chinese Application No. 202010222978.8 mailed Nov. 2, 2021, 5 pages.
Extended European Search Report issued in related European Application No. 21776839.9, mailed Aug. 8, 2023, 7 pages.

* cited by examiner

ELECTRONIC DEVICE

CROSS-REFERENCE

This application is a continuation of International Application No. PCT/CN2021/075178, filed Feb. 4, 2021, which claims priority to Chinese Patent Application No. 202010222978.8, filed Mar. 26, 2020. The entire contents of each of the above-referenced applications are expressly incorporated herein by reference.

TECHNICAL FIELD

The present disclosure relates to the technical field of communications devices, and in particular, to an electronic device.

BACKGROUND

With the variety of user requirements, increasingly more electronic devices enter people's lives, such as a mobile phone and a tablet computer. The electronic device usually has functions such as photographing, making a call, and fingerprint recognition, and therefore can meet use requirements of a user. The foregoing functions of the electronic device are generally completed by corresponding functional modules such as a camera module, a receiver, and a fingerprint recognition module.

The camera module is used as an example. A camera module of a current electronic device is built in. In other words, the camera module may be located inside the electronic device, and the camera module can enter or exit a housing of the electronic device through an opening of the housing. In this arrangement manner of the camera module, occupation of a display area by the camera module can be avoided. This is conducive to increasing a screen-to-body of the electronic device. However, the camera module in the foregoing solution can only implement forward or backward photographing of the electronic device. Therefore, a use scenario of the camera module is limited, and photographing freedom is relatively low, and consequently, a function of the camera module is limited. To improve the function of the camera module, the camera module may be separated from the housing, so that a photographing function of the electronic device is not limited by a direction and an angle, thereby improving the function of the camera module.

However, when a separated functional component such as the camera module is separated from the housing, the opening on the housing is exposed, so that dust or water vapor in an external environment easily enters the housing, thereby causing damage to an electronic component in the electronic device, and further reducing security and reliability of the electronic device.

SUMMARY

The present disclosure discloses an electronic device.

According to a first aspect, an embodiment of the present disclosure discloses an electronic device, including: a housing, where the housing has an inner cavity, and the inner cavity has an opening; a functional module, where the functional module may protrude outside the inner cavity through the opening and is separated from the housing or retracted into the inner cavity; a blocking member, where the blocking member is movably disposed in the inner cavity, and the blocking member corresponds to the opening; and a driving assembly, where the driving assembly is disposed in the inner cavity, the driving assembly is connected to the blocking member, the driving assembly drives the blocking member to switch between a first state and a second state, the blocking member is away from the opening in the first state, and the blocking member blocks the opening in the second state. In a case that at least a part of the functional module is located in the inner cavity, the blocking member is in the first state, and in a case that the functional module is separated from the housing, the blocking member is in the second state.

The technical solutions used in the present disclosure can achieve the following effects:

In the embodiments of the present disclosure, the blocking member is movably disposed in the inner cavity, and the blocking member corresponds to the opening. The driving assembly drives the blocking member to switch between the first state and the second state, the blocking member is far away from the opening in the first state, and the blocking member blocks the opening in the second state. In a case that at least a part of the functional module is located in the inner cavity, the blocking member is in the first state, and in a case that the functional module is separated from the housing, the blocking member is in the second state. In this solution, when the functional module is separated from the housing, the driving assembly drives the blocking member to switch to the second state. In this case, the blocking member may block the opening, so that dust and water vapor in an external environment do not easily enter the housing, thereby improving waterproof performance and dustproof performance of the electronic device, causing no damage to an electronic component of the electronic device, and improving security and reliability of the electronic device.

BRIEF DESCRIPTION OF DRAWINGS

The following briefly describes the accompanying drawings for describing the embodiments or the background. Apparently, a person of ordinary skill in the art may still derive other drawings from these accompanying drawings without creative efforts.

DESCRIPTION OF REFERENCE NUMERALS

100—Housing, 110—Inner cavity, 120—Opening;
200—Functional module;
300—Driving assembly, 310—Drive source, 320—Screw rod, 330—Guide rod, 340—Screw sleeve, 350—Support, 351—Body part, 352—Supporting member;
400—Blocking member.

DETAILED DESCRIPTION

The following describes the technical solutions of the present disclosure with reference to embodiments of the present disclosure and corresponding accompanying drawings. Apparently, the described embodiments are only some rather than all embodiments of the present disclosure. Based on the embodiments of the present disclosure, all other embodiments obtained by a person of ordinary skill in the art without creative efforts fall within the protection scope of the present disclosure.

The technical solutions disclosed in the embodiments of the present disclosure are described in detail below with reference to the accompanying drawings.

Figure 1:
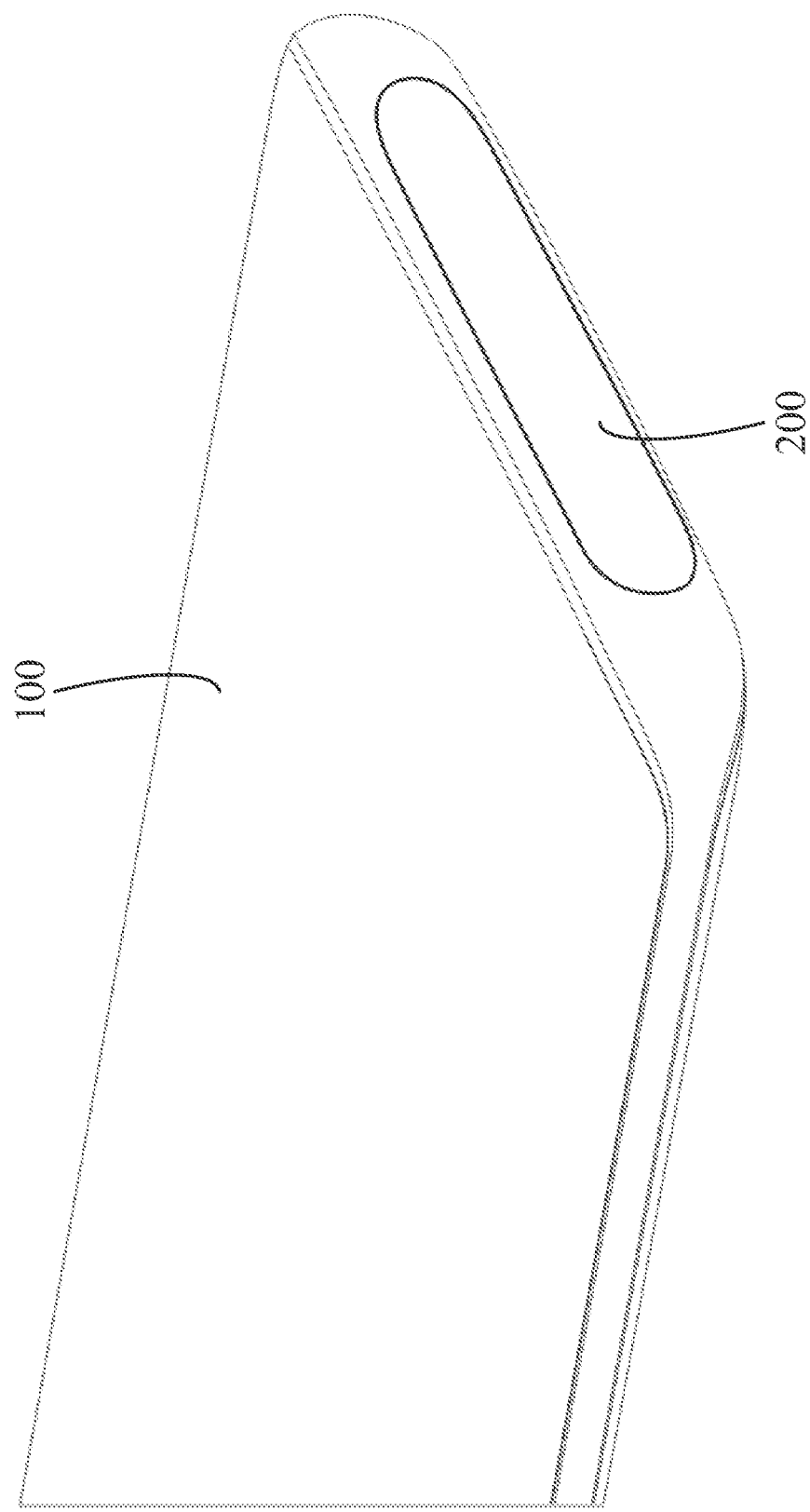
FIG. 1 is a schematic diagram of a structure of an electronic device according to an embodiment of the present disclosure.
Figure 2:
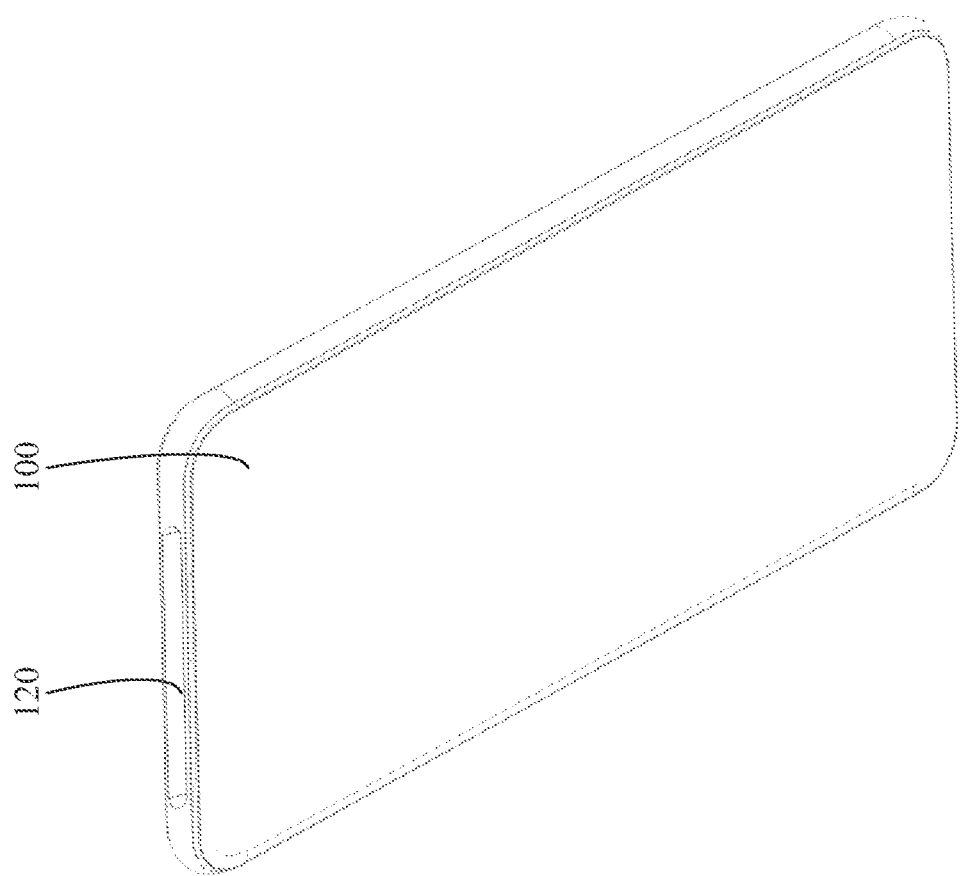
FIG. 2 is a schematic diagram of a structure of an electronic device when a housing is separated from a functional module according to an embodiment of the present disclosure.
Figure 3:
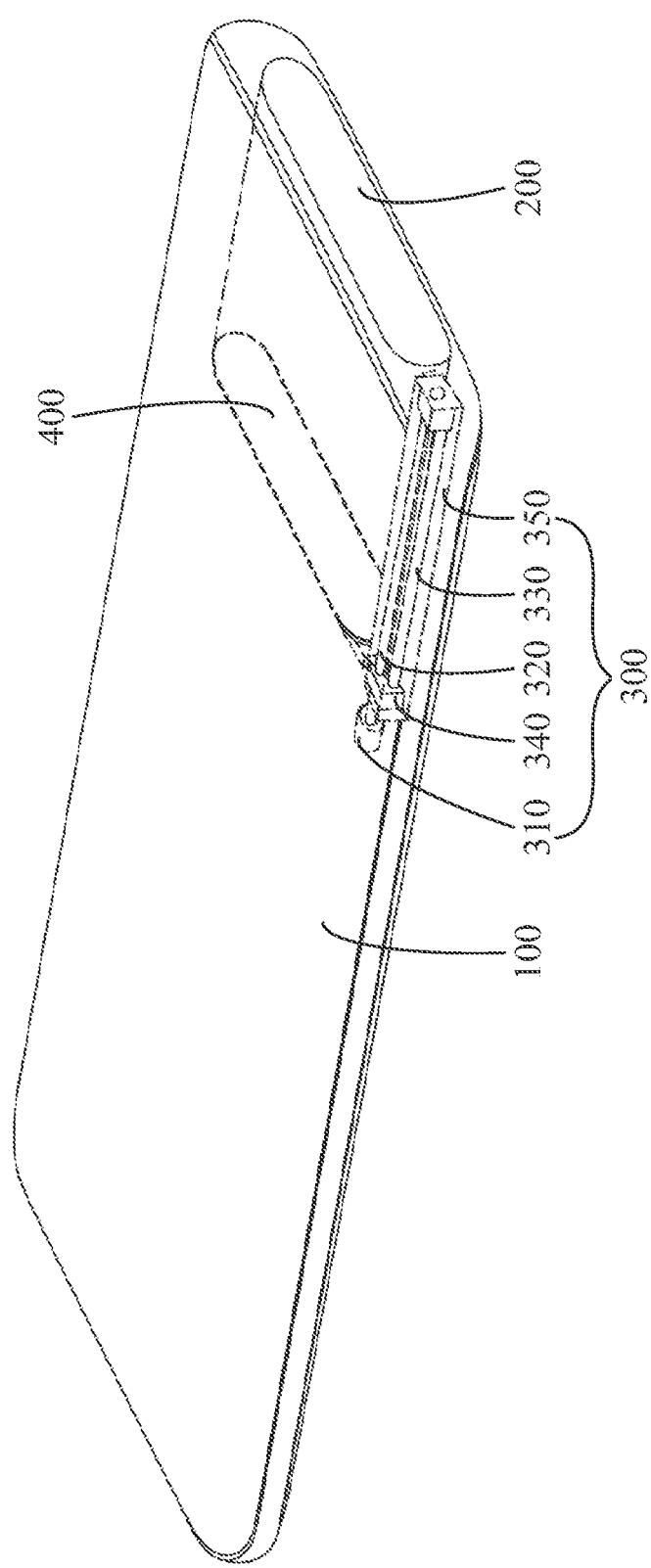
FIG. 3 to FIG. 5 are schematic diagrams of an operation process in which a blocking member of an electronic device blocks an opening according to an embodiment of the present disclosure.
Figure 4:
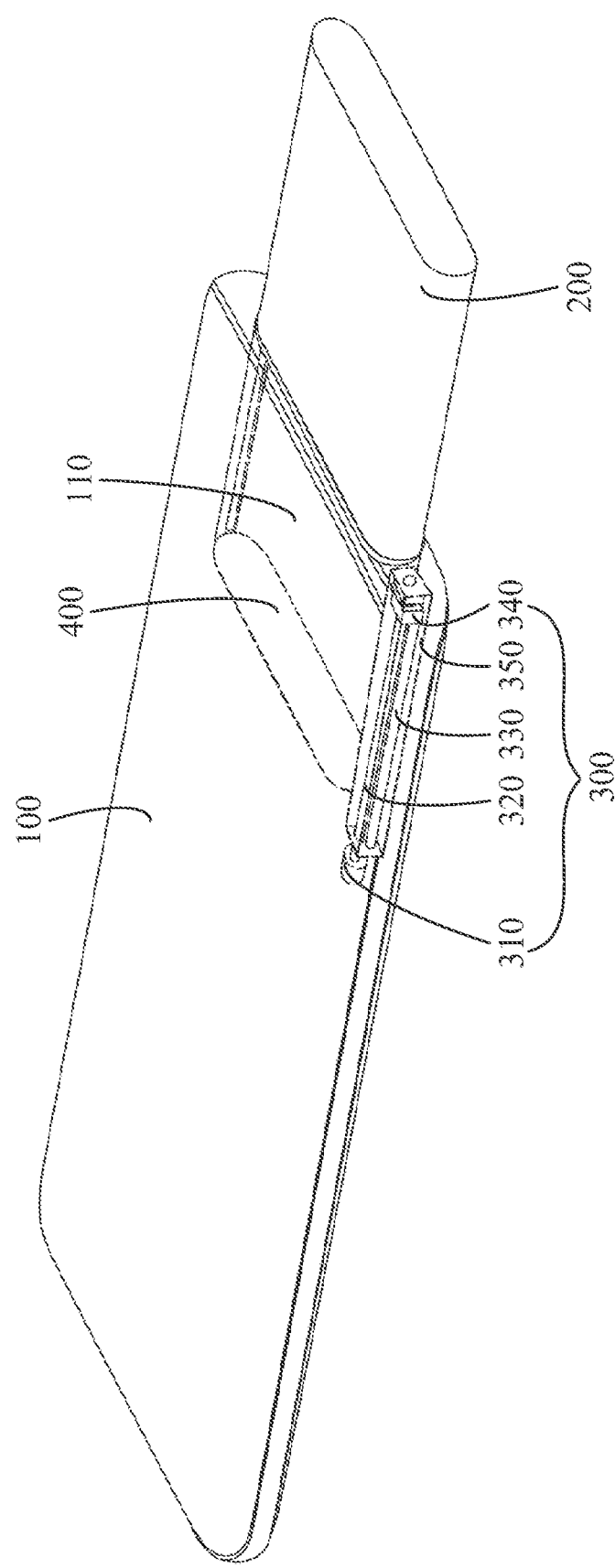
Figure 5:
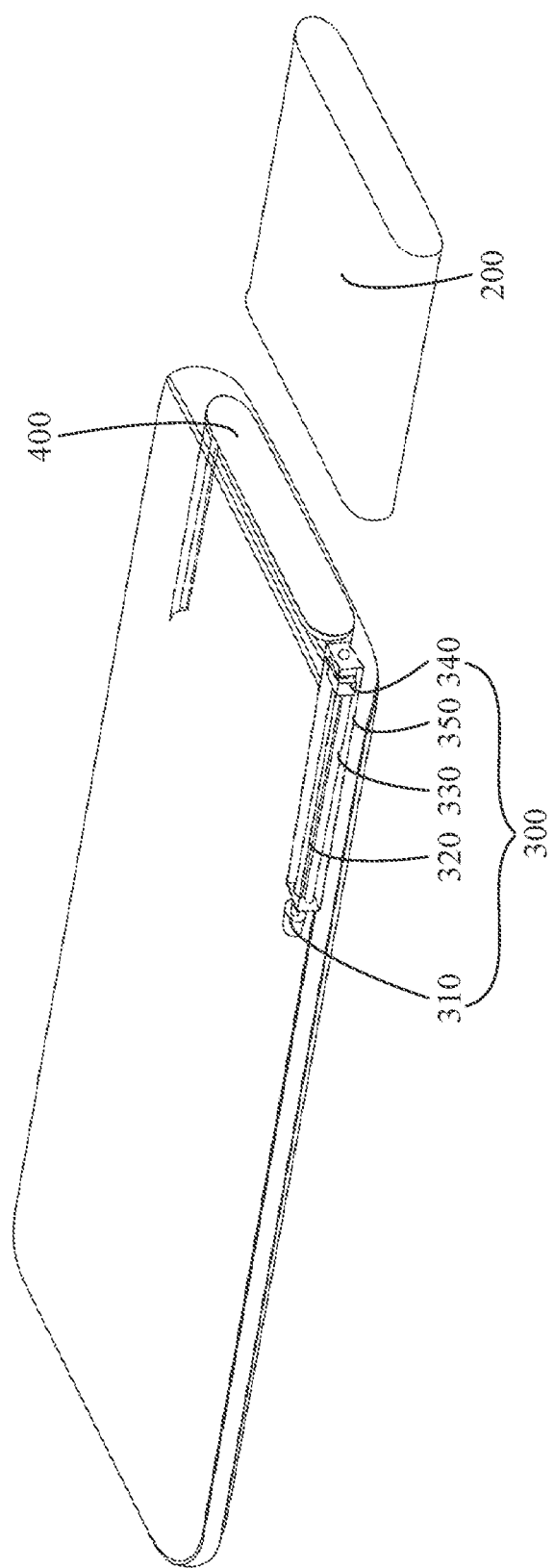
Figure 6:
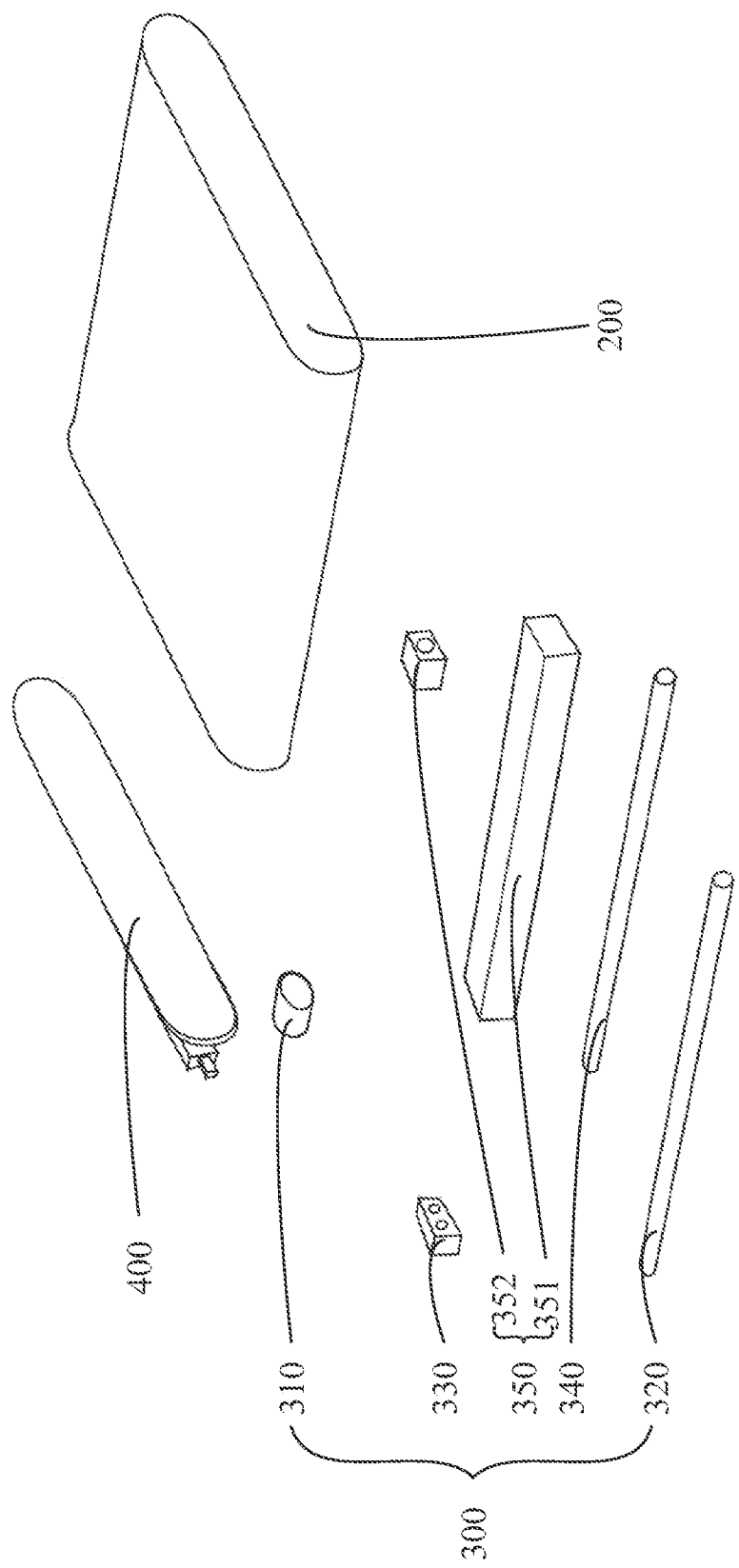
FIG. 6 is an exploded diagram of a driving assembly and a functional module of an electronic device according to an embodiment of the present disclosure.

As shown in FIG. 1 to FIG. 6, an embodiment of the present disclosure discloses an electronic device, and the electronic device includes a housing 100, a functional module 200, a blocking member 400, and a driving assembly 300.

The housing 100 provides a mounting basis for another component of the electronic device, the housing 100 has an inner cavity 110, and the inner cavity 110 has an opening 120. In some embodiments, housings 100 in different structures include different components. For example, the housing 100 may include a front housing, a rear cover, and a middle frame disposed between the front housing and the rear cover, the front housing, the rear cover, and the middle frame jointly form the inner cavity 110, and the opening 120 may be disposed on the front housing, may be disposed on the rear cover, or may be disposed on the middle frame. For another example, the housing 100 may include a front cover and a rear cover, the front cover and the rear cover jointly form the inner cavity 110, and the opening 120 may be disposed on the front cover, may be disposed on the rear cover, or may be disposed in an assembly gap between the front cover and the rear cover.

The functional module 200 may protrude outside the inner cavity 110 through the opening 120 and be separated from the housing 100 or retracted into the inner cavity 110. In some embodiments, the functional module 200 may include at least one of a camera module, a fingerprint recognition module, a receiver, a strobe light, a sensor, an unmanned aerial vehicle, or a card holder, and may further include another component that needs to enter and exit the housing 100. When the functional module 200 needs to switch an operating state, the functional module 200 may protrude outside the housing 100 through the opening 120, and be separated from the housing 100. After completing working, the functional module 200 may be retracted into the housing 100 through the opening 120 on the housing 100. Such a functional module 200 does not occupy a display area of the electronic device. Therefore, a screen-to-body of the electronic device is relatively large. In addition, the functional module 200 may be separated from the housing 100, so that the functional module 200 can independently work as a functional monomer during use, and is not limited by a direction and an angle, thereby improving use flexibility of the functional module 200.

The blocking member 400 is movably disposed in the inner cavity 110, and the blocking member 400 corresponds to the opening 120. The driving assembly 300 is disposed in the inner cavity 110, and the driving assembly 300 is connected to the blocking member 400. The blocking member 400 has a first state and a second state, and the driving assembly 300 drives the blocking member 400 to switch between the first state and the second state. In a case that at least a part of the functional module 200 is located in the inner cavity 110, the blocking member 400 is in the first state, and in this case, the blocking member 400 is in the inner cavity 110, and the blocking member 400 is far away from the opening 120, to avoid the functional module 200, and the functional module 200 blocks the opening 120. In a case that the functional module 200 is separated from the housing 100, the blocking member 400 is in the second state, and in this case, the functional module 200 is separated from the housing 100, and the blocking member 400 blocks the opening 120.

In some embodiments, the driving assembly 300 may be a structure such as a linear motor or an air cylinder, and another power structure may be used. This is not limited in this specification.

In this embodiment of the present disclosure, when the functional module 200 is separated from the housing 100, the driving assembly 300 drives the blocking member 400 to switch to the second state. In this case, the blocking member 400 may block the opening 120, so that dust and water vapor in an external environment do not easily enter the housing 100, thereby improving waterproof performance and dustproof performance of the electronic device, causing no damage to an electronic component of the electronic device, and improving security and reliability of the electronic device.

In addition, after the functional module 200 is separated from the housing 100, the opening 120 on the housing 100 is blocked by the blocking member 400, and a user does not easily see the opening 120. In this way, the user has a relatively weak feeling of visual impact, and therefore appearance quality of the electronic device is better, thereby improving user experience.

In the foregoing embodiment, in a case that the blocking member 400 is in the second state, to avoid interference caused by the blocking member 400 to an edge of the opening 120, in a projection in a direction in which the functional module 200 protrudes, a projection outline of the blocking member 400 is located within a projection outline of the opening 120. In this case, there is a gap between a side wall of the opening 120 and a side wall of the blocking member 400, and dust and water vapor in an environment may enter the inner cavity 110 through the gap, and consequently, security and reliability of the electronic device are reduced. In another embodiment, in a case that the blocking member 400 is in the second state, at least a part of the blocking member 400 is in the opening 120, and an edge of the blocking member 400 and an edge of the opening 120 cooperate, through limiting, in a direction in which the functional module 200 protrudes. In this case, the blocking member 400 may be a stepped structure, and a step surface of the blocking member 400 can fit the edge of the opening 120. The step surface is the edge of the blocking member 400, and the step surface can block the gap, so that dust and water vapor do not easily enter the inner cavity 110, thereby further improving the security and reliability of the electronic device. In addition, the edge of the blocking member 400 and an inner surface of the opening 120 cooperate, through limiting, in the direction in which the functional module 200 protrudes, and the edge of the blocking member 400 interferes with the opening 120 in terms of positions, to prevent the blocking member 400 from protruding excessively from the opening 120.

In a case that the blocking member 400 is in the second state, a part of the blocking member 400 may be higher than an outer surface of the housing 100. Consequently, an overall appearance size of the electronic device increases, and poor user experience is caused. The outer surface of the housing 100 may also be higher than the blocking member 400, so that a groove is left at a connection between the opening 120 and the blocking member 400, and dust is easily collected in the groove, and consequently, the blocking member 400 is stuck when moving. In an embodiment, in a case that the blocking member 400 is in the second state, an outer surface that is of the blocking member 400 and that is exposed to the housing 100 is coplanar with the outer surface of the housing 100. In this solution, a connection between the blocking member 400 and the opening 120 is relatively smooth, so that an appearance size of the electronic device is relatively small, thereby improving user experience. In addition, there is no groove at the connection position between the blocking member 400 and the opening 120, and therefore dust is not easily collected, so that the blocking member 400 is not prone to being stuck, thereby improving reliability of the electronic device.

In the foregoing embodiment, the user may manually drive the functional module 200 to enter or exit the inner cavity 110. However, there is a problem of relatively low precision in the manual operation manner, and further, when the user is relatively far away from the electronic device, the user needs to approach the electronic device to implement a driving operation, and therefore, the operation is not easy to implement. Therefore, the electronic device may further include a drive mechanism, where the drive mechanism is disposed in the inner cavity 110, the drive mechanism is connected to the functional module 200, the drive mechanism drives the functional module 200 to protrude outside the inner cavity 110 through the opening 120, and enables the functional module 200 to be separated from the housing 100, or the drive mechanism drives the functional module 200 to be retracted into the inner cavity 110 through the opening 120. In this solution, the drive mechanism can accurately drive the functional module 200 to enter or exit the inner cavity 110. In addition, the user may trigger an action of the drive mechanism through remote control, to drive the functional module 200 to protrude outside the inner cavity 110 or be retracted into the inner cavity 110 through the opening 120. In this way, an operation on the functional module 200 is easier to implement. In some embodiments, the drive mechanism may be a structure such as a drive motor, a linear motor, or an air cylinder, and the drive mechanism may be another structure for outputting power. This is not limited in this specification.

In the foregoing embodiment, the blocking member 400 and the functional module 200 are driven by using a corresponding power mechanism. In this case, mounting positions of two power mechanisms need to be reserved on the housing 100, and consequently, relatively large space of the inner cavity 110 is occupied. In addition, two power mechanisms are disposed in the electronic device, and consequently, costs of the electronic device are relatively high. In another embodiment, in a case that the blocking member 400 is in the first state, the blocking member 400 is located on a side of the functional module 200 that is away from the opening 120, the blocking member 400 is connected to the functional module 200, the driving assembly 300 drives the blocking member 400 to move, and the functional module 200 protrudes outside the inner cavity 110 or is retracted into the inner cavity 110 through the opening 120 together with the blocking member 400. In this solution, the blocking member 400 and the functional module 200 share one power mechanism, and only one power mechanism mounting position needs to be reserved in the inner cavity 110. In addition, manufacturing costs of the electronic device are relatively low, and the structural design of the electronic device is more single. In this case, the blocking member 400 and the functional module 200 can share a power mechanism to move, and there is no need to configure a power mechanism for each of the blocking member 400 and the functional module 200. Therefore, energy consumption of the electronic device can be reduced, and a battery life of the electronic device can be prolonged.

In some embodiments, the functional module 200 is in contact with a surface of the blocking member 400. The functional module 200 and the blocking member 400 may be connected through magnetic suction, clamping, or the like.

In addition, the functional module 200 and the blocking member 400 may move simultaneously. In a process in which the blocking member 400 changes a state through movement, the functional module 200 can be driven to change a position. This can undoubtedly improve driving efficiency.

In the foregoing embodiment, when the functional module 200 needs to be retracted into the inner cavity 110, the blocking member 400 is first in contact with the functional module 200, and then the user needs to send an instruction, so that the blocking member 400 switches to the first state. This operation manner is relatively cumbersome and has a relatively low degree of intelligence. In an embodiment, the electronic device disclosed in this embodiment of the present disclosure may further include a detection member and a control member. The detection member is configured to detect position information of the functional module 200 and the blocking member 400. The control member may control the driving assembly 300 based on the position information. The driving assembly 300 drives the blocking member 400 to switch between the first state and the second state. In this solution, the detection member detects the position information of the functional module 200 and the blocking member 400. When the position information matches preset position information, the control member controls the driving assembly 300 to drive the blocking member 400, so that driving operations of the blocking member 400 and the functional module 200 are simpler and more intelligent.

In some embodiments, the detection member may be a distance sensor. When the blocking member 400 is in contact with the functional module 200, the driving assembly drives the blocking member 400 to switch to the first state. Contact between the blocking member 400 and the functional module 200 is the preset position information of the electronic device. The detection member and the control member may be disposed on the blocking member 400, or may be disposed on the functional module 200, or one of the detection member and the control member is disposed on the blocking member 400, and the other is disposed on the functional module 200.

An exemplary structure of the detection member is provided in this specification. Another structure may be used. This is not limited in this specification. In some embodiments, the detection member may include a first electrical contact and a second electrical contact. The first electrical contact may be disposed on the blocking member 400. The second electrical contact may be disposed on the functional module 200. In a case that the functional module 200 is connected to the blocking member 400, the first electrical contact and the second electrical contact are electrically conductive. In a exemplary operation process, when the functional module 200 is in the inner cavity 110 and is in contact with the blocking member 400, the first electrical contact and the second electrical contact are electrically conductive. In this case, the driving assembly 300 drives the blocking member 400 to move away from the opening 120 or keep the blocking member 400 in the inner cavity 110. When the functional module 200 is separated from the housing 100, the blocking member 400 is separated from the functional module 200, and the first electrical contact and the second electrical contact are powered off. In this case, the driving assembly 200 drives the blocking member 400 to block the opening 120. In this solution, through detection of a voltage between the first electrical contact and the second electrical contact, information about a position between the functional module 200 and the blocking member 400 can be detected. This manner is simple and reliable, and is easy to operate.

In another embodiment, the functional module 200 may have a first surface exposed to the housing 100. In a case that the blocking member 400 is in the first state, the functional module 200 is in the inner cavity 110, and the first surface is coplanar with a surface of the housing 100. In this case, the functional module 200 does not protrude from the housing 100, and the housing 100 seen by the user is an integral part. In this way, appearance performance and grabbing performance of the electronic device are improved, and user experience is improved.

An exemplary structure of the driving assembly 300 is provided in this specification. In some embodiments, another structure form may be used. This is not limited in this specification. In some embodiments, the driving assembly 300 may include a drive source 310, a screw rod 320, a guide rod 330, a screw sleeve 340, and a support 350. The support 350 may provide a mounting basis for another part of the driving assembly 300. The drive source 310 is connected to one end of the screw rod 320, the screw rod 320 is rotatably connected to the support 350, the support 350 is connected to the guide rod 330, an extension direction of the screw rod 320 is the same as an extension direction of the guide rod 330, the screw rod 320 cooperates with the screw sleeve 340 through screwing, the screw sleeve 340 is movably sleeved on the guide rod 330, and the screw sleeve 340 is connected to the blocking member 400. The drive source 310 may drive the screw sleeve 340 to move by using the screw 320, to drive the blocking member 400 to move. The guide rod 330 guides the screw sleeve 340. Compared with a linear motor and an air cylinder, driving force provided by the driving assembly 300 is more stable, so that the blocking member 400 is less prone to slanting in a moving process.

In some embodiments, the drive source 310 may be a drive motor, the support 350 may include a body part 351 and a supporting member 352, the supporting member 352 is disposed at one end of the body part 351, the drive source 310, the screw rod 320, and the guide rod 330 are mounted on the body part 351, a mounting hole is disposed on the supporting member 352, one end of the screw rod 320 is located in the mounting hole, and the screw rod 320 may rotate relative to the mounting hole.

In an embodiment, a first guiding part may be disposed on the housing 100, a second guiding part may be disposed on the blocking member 400, and the first guiding part cooperates with the second guiding part through sliding. In this solution, the driving assembly 300 drives the blocking member 400 to move in an extension direction of the first guiding part, and the first guiding part may assist in limiting a movement track of the blocking member 400 by using the second guiding part, so that the blocking member 400 moves in the extension direction of the first guiding part. This solution can limit and guide a moving direction of the blocking member 400, to more reliably prevent the blocking member 400 from slanting in a moving process. In some embodiments, the first guiding part may be a guiding groove, and the second guiding part may be a guiding protrusion.

In another embodiment, a third guiding part may be disposed on the functional module 200, and the third guiding part cooperates with the first guiding part through sliding. In this solution, a movement direction of the functional module 200 can be limited and guided, to more reliably prevent the functional module 200 from slanting in a moving process. In some embodiments, the first guiding part may be a guiding groove, and the third guiding part may be a guiding protrusion.

To further improve waterproof performance and dust-proof performance of the electronic device, in an embodiment, the electronic device disclosed in this embodiment of the present disclosure may further include a sealing member, such as a sealing ring and a sealing strip. In a case that the blocking member 400 is in the second state, the blocking member 400 and the opening 120 are sealed by using the sealing member. In this case, waterproof performance and dustproof performance of the electronic device are further improved.

In an embodiment, the housing 100 may include a bezel, and the opening 120 may be opened on the bezel. The bezel is located on a side surface of the housing 100, and the opening 120 is disposed on the bezel, so that the user cannot easily see the bezel, and the user has relatively weak feeling of visual impact, and therefore appearance quality of the electronic device is better.

The electronic device disclosed in the embodiments of the present disclosure may be a device such as a smartphone, a tablet computer, an e-book reader, a wearable device (for example, a smart watch), or a video game. The type of the electronic device is not limited in the embodiments of the present disclosure.

The foregoing embodiments of the present disclosure focus on describing differences between the embodiments, and different optimization features of the embodiments may be combined to form better embodiments provided that they are not contradictory. Considering brevity, details are not described herein again.

The foregoing descriptions are merely embodiments of the present disclosure, and are not intended to limit the present disclosure. For a person skilled in the art, various changes and variations may be made in the present disclosure. Any modification, equivalent replacement, and improvement made in the spirit and principles of the present disclosure shall be included in the scope of the claims of the present disclosure.

The invention claimed is:

1. An electronic device, comprising:
   a housing having an inner cavity, wherein the inner cavity comprises an opening;
   a functional module protruding outside the inner cavity through the opening and being configured to separate from the housing or retract into the inner cavity;
   a blocking member movably disposed in the inner cavity and corresponding to the opening; and
   a driving assembly disposed in the inner cavity and being connected to the blocking member, wherein the driving assembly drives the blocking member inside the housing to switch between a first state and a second state, wherein the blocking member is away from the opening in the first state and blocks the opening in the second state, wherein:
   when at least a part of the functional module is located in the inner cavity, the blocking member is in the first state; and
   when the functional module is separated from the housing, the blocking member is in the second state.

2. The electronic device according to claim 1, wherein when the blocking member is in the second state, at least a part of the blocking member is located in the opening, and an edge of the blocking member cooperates, through limiting, with an edge of the opening in a direction in which the functional module protrudes.

3. The electronic device according to claim 1, wherein when the blocking member is in the second state, an outer surface that is of the blocking member and that is exposed to the housing is coplanar with an outer surface of the housing.

4. The electronic device according to claim 1, wherein when the blocking member is in the first state, the blocking member is located on a side of the functional module that is away from the opening, the blocking member is connected to the functional module, the driving assembly drives the blocking member to move, and the functional module protrudes outside the inner cavity or is retracted into the inner cavity through the opening together with the blocking member.

5. The electronic device according to claim 4, wherein the electronic device further comprises a detection member and a control member, wherein the detection member is configured to detect position information of the functional module and the blocking member, and the control member controls the driving assembly based on the position information.

6. The electronic device according to claim 5, wherein the detection member comprises a first electrical contact disposed on the blocking member and a second electrical contact disposed on the functional module, and when the functional module is connected to the blocking member, the first electrical contact and the second electrical contact are electrically conductive.

7. The electronic device according to claim 1, wherein when the functional module has a first surface exposed to the housing and the blocking member is in the first state, the first surface is coplanar with a surface of the housing.

8. The electronic device according to claim 1, wherein the driving assembly comprises a drive source, a screw rod, a guide rod, a screw sleeve, and a support, wherein:
   the drive source is connected to one end of the screw rod;
   the screw rod is rotatably connected to the support;
   the support is connected to the guide rod;
   an extension direction of the screw rod is the same as an extension direction of the guide rod;
   the screw rod cooperates with the screw sleeve through screwing;
   the screw sleeve is movably sleeved on the guide rod; and
   the screw sleeve is connected to the blocking member.

9. The electronic device according to claim 1, wherein:
   a first guiding part is disposed in the housing;
   a second guiding part is disposed in the blocking member; and
   the first guiding part cooperates with the second guiding part through sliding.

10. The electronic device according to claim 1, wherein the electronic device further comprises a sealing member, and when the blocking member is in the second state, the blocking member cooperates with the opening through sealing by using the sealing member.

11. The electronic device according to claim 1, wherein the functional module comprises at least one of a camera module, a fingerprint recognition module, a receiver, a strobe light, a sensor, an unmanned aerial vehicle, or a card holder.

* * * * *